United States Patent
Matono et al.

(10) Patent No.: US 9,530,210 B2
(45) Date of Patent: Dec. 27, 2016

(54) DISTANCE CALCULATOR AND DISTANCE CALCULATION METHOD

(71) Applicant: Hitachi Automotive Systems, Ltd., Hitachinaka-shi, Ibaraki (JP)

(72) Inventors: Haruki Matono, Tokyo (JP); Hiroto Mitoma, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 103 days.

(21) Appl. No.: 14/379,392

(22) PCT Filed: Feb. 6, 2013

(86) PCT No.: PCT/JP2013/052652
§ 371 (c)(1),
(2) Date: Aug. 18, 2014

(87) PCT Pub. No.: WO2013/132947
PCT Pub. Date: Sep. 12, 2013

(65) Prior Publication Data
US 2015/0036886 A1    Feb. 5, 2015

(30) Foreign Application Priority Data

Mar. 9, 2012   (JP) .................................. 2012-052922

(51) Int. Cl.
*G06T 7/00*   (2006.01)
*G08G 1/16*   (2006.01)
(Continued)

(52) U.S. Cl.
CPC .............. *G06T 7/004* (2013.01); *G01B 11/14* (2013.01); *G01C 3/14* (2013.01); *G06T 7/0059* (2013.01); *G08G 1/166* (2013.01)

(58) Field of Classification Search
CPC ................................ G06T 7/004; G06T 7/0059
(Continued)

(56) References Cited

U.S. PATENT DOCUMENTS

| | | | |
|---|---|---|---|
| 6,721,498 B2 * | 4/2004 | Yoshida ................... | G02B 7/34 356/3.14 |
| 7,469,099 B2 * | 12/2008 | Terayama .............. | G03B 13/34 250/201.2 |

(Continued)

FOREIGN PATENT DOCUMENTS

| | | |
|---|---|---|
| JP | 6-230115 A | 8/1994 |
| JP | 10-47954 A | 2/1998 |

(Continued)

OTHER PUBLICATIONS

International Search Report (PCT/ISA/210) dated Apr. 16, 2013 with English translation (four pages).

*Primary Examiner* — Kim Vu
*Assistant Examiner* — Molly Delaney
(74) *Attorney, Agent, or Firm* — Crowell & Moring LLP (57) ABSTRACT

In order to be able to measure a distance with disparity resolution of a stereo camera or less and precisely measure a relative distance to a target even in the event of degradation of the imaging condition, a distance calculator includes a monocular distance calculation section 203, a stereo distance calculation section 204, a blurriness level calculation section 201, a distance estimation section 202, and an output distance calculation section 206. The monocular distance calculation section 203 calculates the distance to a target based on image information captured by a camera 101 or 102. The stereo distance calculation section 204 calculates the distance to the target based on image information captured by the two cameras 101 and 102. The blurriness level calculation section 201 calculates the blurriness level of the image information captured by the image information captured by the cameras 101 and 102. The distance estimation section 202 estimates the distance to the target at the time of (Continued)

capturing of images by the cameras 101 and 102. The output distance calculation section 206 calculates the distance to the target to be output. The output distance calculation section 206 selects, as the distance to be output, the distance calculated by the monocular distance calculation section 203 or the distance calculated by the stereo distance calculation section 204 based on the blurriness level and the estimated distance.

5 Claims, 8 Drawing Sheets

(51) Int. Cl.
 *G01C 3/14* (2006.01)
 *G01B 11/14* (2006.01)
(58) Field of Classification Search
 USPC .......................................................... 382/106
 See application file for complete search history.

(56) References Cited

U.S. PATENT DOCUMENTS

| | | | | |
|---|---|---|---|---|
| 2008/0079954 A1* | 4/2008 | Iwaki | ...................... | G01C 3/08 356/614 |
| 2009/0022393 A1* | 1/2009 | Bar-Zohar | ............ | G06T 7/0075 382/154 |
| 2009/0074396 A1* | 3/2009 | Park | ......................... | G02B 7/38 396/128 |
| 2009/0195666 A1* | 8/2009 | Chen | ......................... | G06T 5/50 348/218.1 |
| 2012/0148109 A1* | 6/2012 | Kawamura | ............... | G01C 3/06 382/106 |
| 2013/0121537 A1* | 5/2013 | Monobe | ............. | H04N 5/23254 382/106 |
| 2014/0055572 A1* | 2/2014 | Shirai | .................. | H04N 5/2258 348/47 |
| 2015/0015673 A1* | 1/2015 | Matono | .................. | G01C 11/06 348/47 |
| 2015/0227815 A1* | 8/2015 | Komatsu | ............... | G06T 7/0069 382/106 |

FOREIGN PATENT DOCUMENTS

| | | |
|---|---|---|
| JP | 2006-322853 A | 11/2006 |
| JP | 2007-263657 A | 10/2007 |
| JP | 2013-186042 A | 9/2013 |

\* cited by examiner

|  |  | BLURRINESS LEVEL (OF ONE OF CAMERAS) | |
|---|---|---|---|
|  |  | 0~50 | 50~100 |
| ESTIMATED DISTANCE (m) | 0~50 | STEREO | MONOCULAR |
|  | 50~ | MONOCULAR | MONOCULAR |

|  |  | BLURRINESS LEVEL (OF ONE OF CAMERAS) | | |
| --- | --- | --- | --- | --- |
|  |  | 0~25 | 25~50 | 50~100 |
| ESTIMATED DISTANCE (m) | 0~20 | STEREO a | STEREO a | STEREO a |
|  | 20~50 | STEREO a | STEREO a | STEREO c |
|  | 50~100 | STEREO b | STEREO c | MONOCULAR |
|  | 100~ | STEREO b | MONOCULAR | MONOCULAR |

DISTANCE CALCULATOR AND DISTANCE CALCULATION METHOD

TECHNICAL FIELD

The present invention relates to a distance calculator and a distance calculation method and relates, for example, to a distance calculator and a distance calculation method that are applied to an imaging system having a plurality of imaging means.

BACKGROUND ART

A variety of safety systems have been made available to date to provide improved safety, for example, in automobile sector.

Recent years have seen the commercialization of a target detection system designed to detect a target such as pedestrians or vehicles using a plurality of stereo cameras or other types of cameras.

The above target detection system calculates the positional deviation (disparity) of the same target in a plurality of images captured at the same time by a plurality of cameras (imaging devices) based, for example, on template matching and calculates the position of the target in a real space based on the disparity and a known conversion formula, thus detecting the target.

A stereo camera-based target detection system such as the one described above designed to recognize a target by calculating distance to the target using a pair of images captured by a plurality of cameras (imaging devices) is applicable not only to the above vehicle safety system but also to a monitoring system adapted to detect entry of an intruder and anomalies.

A stereo camera-based target detection system applied to the above safety system and monitoring system captures images of a target with a plurality of cameras arranged with a given spacing provided therebetween and applies a triangulation technique to the pair of images captured by the plurality of cameras, thus calculating distance to the target.

More specifically, the target detection system includes, in general, at least two imaging devices (cameras) and a stereo image processing LSI (Large Scale Integration). The stereo image processing LSI applies a triangulation process to at least two captured images output from these imaging devices. The stereo image processing LSI performs arithmetic operations to superimpose pixel information included in the pair of images captured by the plurality of cameras and calculates the positional deviation (disparity) between the matching positions of the two captured images, thus performing the triangulation process. It should be noted that, in such a target detection system, each of the imaging devices must be adjusted to eliminate deviations in optical, signal and other characteristics between the imaging devices, and the distance between the imaging devices must be found precisely in advance, in order to ensure that there is no deviation other than disparity in the pair of images captured by the plurality of cameras.

Figure 9:
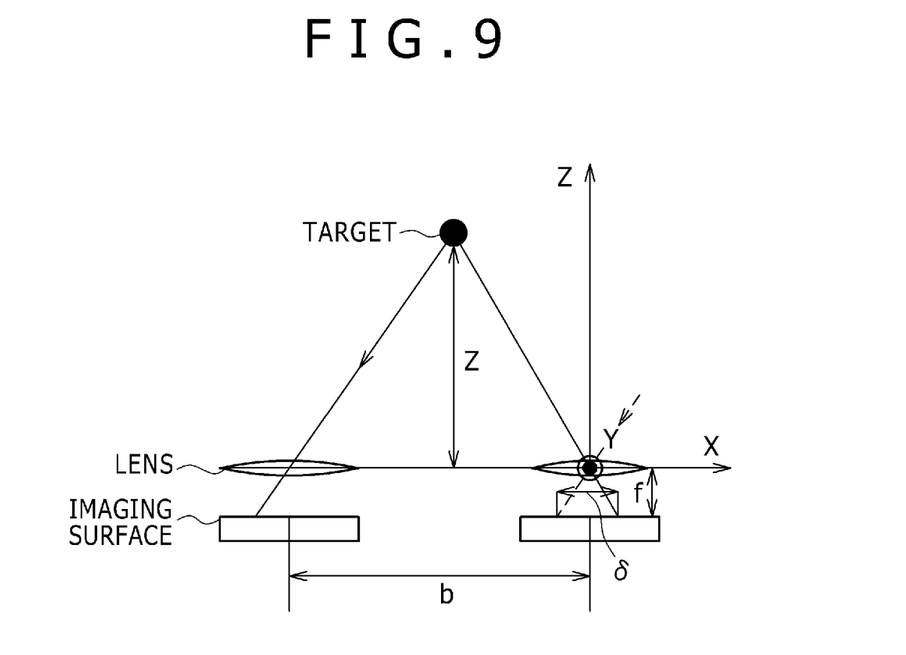
FIG. 9 is a diagram describing the principle behind a stereo camera-based target detection system.

FIG. 9 describes the principle behind the stereo camera-based target detection system. In FIG. 9, $\sigma$ is the disparity (positional deviation between the matching positions of the pair of captured images), Z is the distance to the target to be measured, f is the focal distance of the imaging device, and b is the base line length (distance between the imaging devices). Formula (1) shown below holds between these parameters.

[Formula 1]

$$Z = b \cdot f / \sigma \quad (1)$$

Incidentally, a stereo camera-based target detection system has a problem in that because the longer the distance to the target to be measured, the smaller the disparity $\sigma$, decline in the capability to calculate the disparity $\sigma$ results in lower accuracy in calculating the distance to the target. Further, when located far away, the target becomes smaller in the captured image. Therefore, dirt or raindrops adhering to the lens of one of the cameras or the lenses of both thereof make it difficult to recognize that target, thus resulting in even lower accuracy in calculating the distance to the target.

In order to solve such a problem, Patent Document 1 discloses a technology for merging stereo camera and monocular camera technologies to complement the drawbacks of the two technologies.

The three-dimensional coordinate acquisition device disclosed in Patent Document 1 calculates three-dimensional coordinates of a target from images captured by monocular and stereo cameras so as to simply switch between the two calculation results or combining the two results. Further, when combining the two calculation results, this device changes the weights of the results in accordance with the distances from the cameras to the target, the vehicle speed, the number of flows, and the accuracy.

PRIOR ART DOCUMENTS

Patent Document

Patent Document 1: JP-2007-263657-A

SUMMARY OF THE INVENTION

Problem to be Solved by the Invention

The three-dimensional coordinate acquisition device disclosed in Patent Document 1 uses images captured by monocular and stereo cameras. This makes it possible to measure the distance to the target in each of monocular and stereo camera areas. This also makes it possible to provide improved accuracy in calculating the distance to the target by assigning weights to the three-dimensional coordinates of the target calculated from the images captured by the monocular and stereo cameras in accordance with the distance to the target, the vehicle speed, and other factors.

However, the three-dimensional coordinate acquisition device disclosed in Patent Document 1 cannot solve the problem of decline in accuracy for calculating the distance to the target in the event of decline in reliability of the image captured by each of the cameras due to raindrops, dirt, and so on.

The present invention has been devised in light of the foregoing, and it is an object of the present invention to provide a distance calculator and a distance calculation method capable of measuring a distance with disparity resolution of a stereo camera or less and precisely measuring a relative distance to a target even in the event of degradation of the imaging condition such as dirt or raindrops adhering to a camera or foggy camera lens.

Means for Solving the Problem

In order to solve the above problem, a distance calculator according to the present invention is a distance calculator for an imaging system having a plurality of imaging devices. The distance calculator includes first and second distance calculation sections, a blurriness level calculation section, a distance estimation section, and an output distance calculation section. The first distance calculation section calculates the distance to a target based on image information captured by one of the plurality of imaging devices. The second distance calculation section calculates the distance to the target based on image information captured by at least two of the plurality of imaging devices. The blurriness level calculation section calculates the blurriness level of the image information captured by the single imaging device and that of the image information captured by the at least two imaging devices. The distance estimation section estimates the distance to the target at the time of capturing of images by the single imaging device and the at least two imaging devices. The output distance calculation section calculates the distance to the target to be output. The output distance calculation section selects either a first distance calculated by the first distance calculation section or a second distance calculated by the second distance calculation section as the distance to be output, the selection being based on the blurriness level calculated by the blurriness level calculation section and the estimated distance estimated by the distance estimation section.

Further, a distance calculation method according to the present invention is a distance calculation method of an imaging system having a plurality of imaging devices. The distance calculation method calculates the distance to a target based on image information captured by one of the plurality of imaging devices. Further, the distance calculation method calculates the distance to the target based on image information captured by at least two of the plurality of imaging devices. Still further, the distance calculation method calculates the blurriness level of the image information captured by the single imaging device and that captured by at least two of the plurality of imaging devices. Still further, the distance calculation method estimates the distance to the target at the time of capturing of images by the single imaging device and the at least two imaging devices. Still further, the distance calculation method selects one of the two calculated distances as the distance to the target to be output based on the blurriness level and the estimated distance.

Effect of the Invention

According to the distance calculator and the distance calculation method of the present invention, an imaging system having a plurality of imaging devices can measure a distance with disparity resolution of a stereo camera or less and can precisely measure a relative distance to a target even in the event of degradation of the imaging condition of the imaging device.

Problems, configuration and effects other than those described above will become apparent by the description of preferred embodiments given below.

MODES FOR CARRYING OUT THE INVENTION

A description will be given below of embodiments of the distance calculator and the distance calculation method according to the present invention with reference to the accompanying drawings.

First Embodiment

Figure 1:
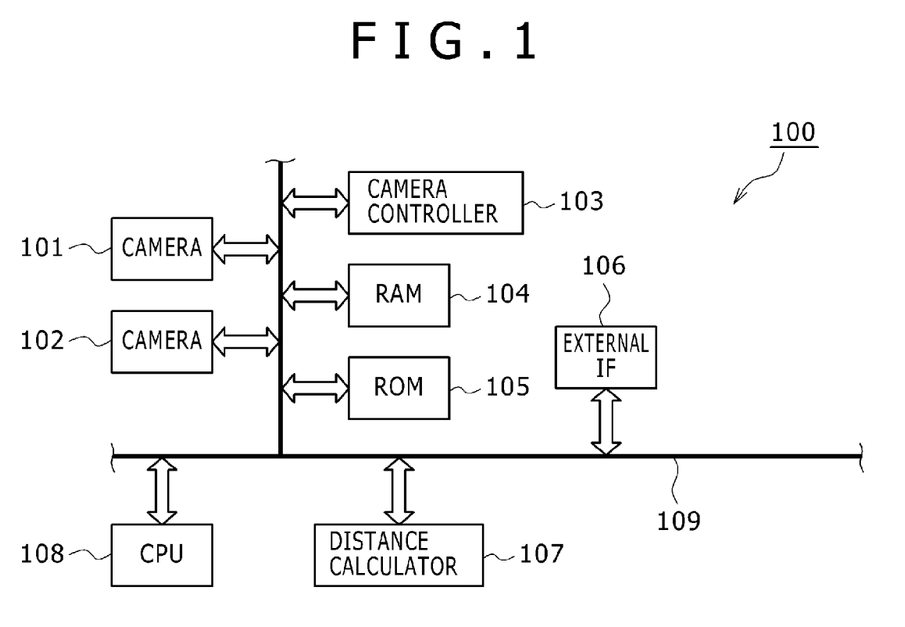
FIG. 1 is an overall configuration diagram schematically illustrating an imaging system to which a first embodiment of a distance calculator according to the present invention is applied.

FIG. 1 schematically illustrates an imaging system to which a first embodiment of the distance calculator according to the present invention is applied.

An imaging system 100 illustrated in FIG. 1 primarily includes two cameras (imaging devices) 101 and 102, a camera controller 103, a RAM 104, a ROM 105, an external IF 106, a distance calculator 107, and a CPU 108. The cameras 101 and 102 are arranged with a given spacing therebetween. The camera controller 103 controls the cameras 101 and 102. The RAM 104 is a temporary storage area adapted to store, for example, images captured by the cameras 101 and 102. The ROM 105 stores programs and a variety of initial values. The external IF 106 is a communication means adapted to notify the recognition conditions of the cameras to control systems such as brakes and to the user. The distance calculator 107 calculates the distance to a target. The CPU 108 controls this system as a whole. These components can exchange information with each other via a bus 109. That is, the imaging system 100 is capable of stereo camera-based distance measurement to a target by using the two cameras 101 and 102.

It should be noted that each of the cameras 101 and 102 includes an imaging element such as CCD (Charge Coupled Device Image Sensor) or CMOS (Complementary Metal Oxide Semiconductor) sensor. The cameras 101 and 102 are controlled by the camera controller 103 to capture images at the same time. Further, the cameras 101 and 102 are controlled to have the same exposure settings in order to ensure that the brightness levels are the same when matching points are searched for in images captured by the cameras 101 and 102.

Figure 2:
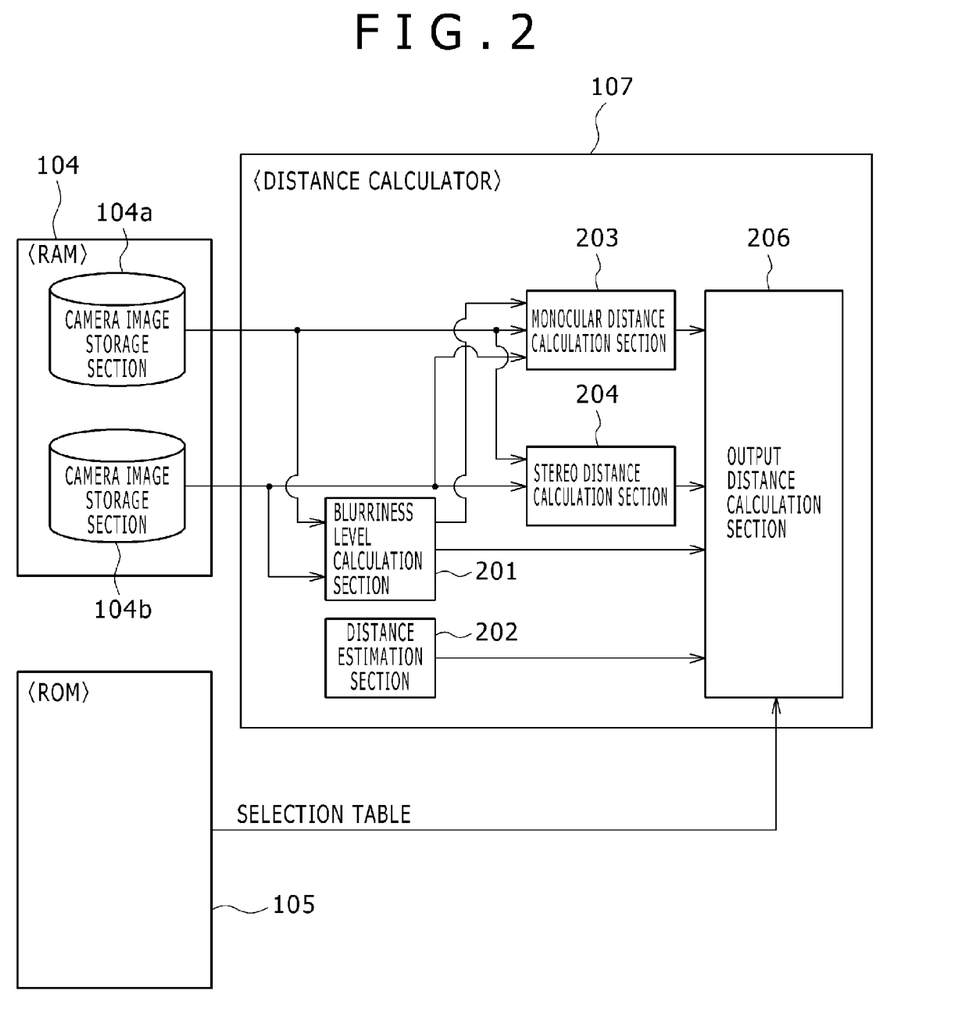
FIG. 2 is an internal configuration diagram illustrating the internal configuration of the distance calculator of the first embodiment illustrated in FIG. 1.

FIG. 2 illustrates the internal configuration of the distance calculator of the first embodiment illustrated in FIG. 1. It should be noted that the images captured by the cameras 101 and 102 are temporarily stored respectively in camera image storage sections 104a and 104b of the RAM 104.

The distance calculator 107 illustrated in FIG. 2 primarily includes a blurriness level calculation section 201, a distance estimation section 202, a monocular distance calculation section (first distance calculation section) 203, a stereo distance calculation section (second distance calculation section) 204, and an output distance calculation section 206.

The blurriness level calculation section 201 rates the blurriness levels of image information captured by the camera 101 and stored in the camera image storage section 104a and image information captured by the camera 102 and stored in the camera image storage section 104b. Among approaches that can be used to rate the blurriness level are rating the edge intensity and the contrast level of the image. The blurriness level calculation section 201 calculates this rating as a blurriness level and transmits the calculation result to the monocular distance calculation section 203 and the output distance calculation section 206.

The monocular distance calculation section 203 calculates the distance to a target (first distance) based on image information captured by the camera 101 and stored in the camera image storage section 104a or image information captured by the camera 102 and stored in the camera image storage section 104b, transmitting the calculation result to the output distance calculation section 206. Here, the monocular distance calculation section 203 determines, based on the blurriness level transmitted from the blurriness level calculation section 201, whether to use the image information stored in the camera image storage section 104a or the image information stored in the camera image storage section 104b to calculate the distance.

More specifically, the monocular distance calculation section 203 compares the blurriness level of image information stored in the camera image storage section 104a and the blurriness level of image information stored in the camera image storage section 104b, calculating the distance to the target based on the image information having relatively less blurriness level. As a result, it is possible to calculate the distance to the target based on the image information captured by the camera that has less blurriness level and is capable of capturing images in a more proper manner even in the event of degradation of the imaging condition of one of the cameras due, for example, to staining by dirt or raindrops. This ensures that the accuracy of distance measurement by the monocular distance calculation section 203 is maintained.

It should be noted that any of hitherto known techniques can be used to calculate the distance. One among such techniques is calculation using vehicle width. More specifically, a vehicle area (position on the screen) is calculated from image information obtained from the camera image storage section 104a or image information obtained from the camera image storage section 104b through pattern matching. Here, the term "pattern matching" refers to an approach that calculates the correlation value of a captured image's brightness level and considers a brightness level equal to or greater than a given level as a "vehicle", and determines that area to be a "vehicle area." This makes it possible to calculate the vehicle width from image information obtained from the camera image storage section 104a or image information obtained from the camera image storage section 104b. As a result, assuming that the image capturing direction of the camera and the rear face of the vehicle are approximately perpendicular to each other, it is possible to readily calculate the approximate distance to the vehicle, a target, from the assumed width of the vehicle.

Figure 3:
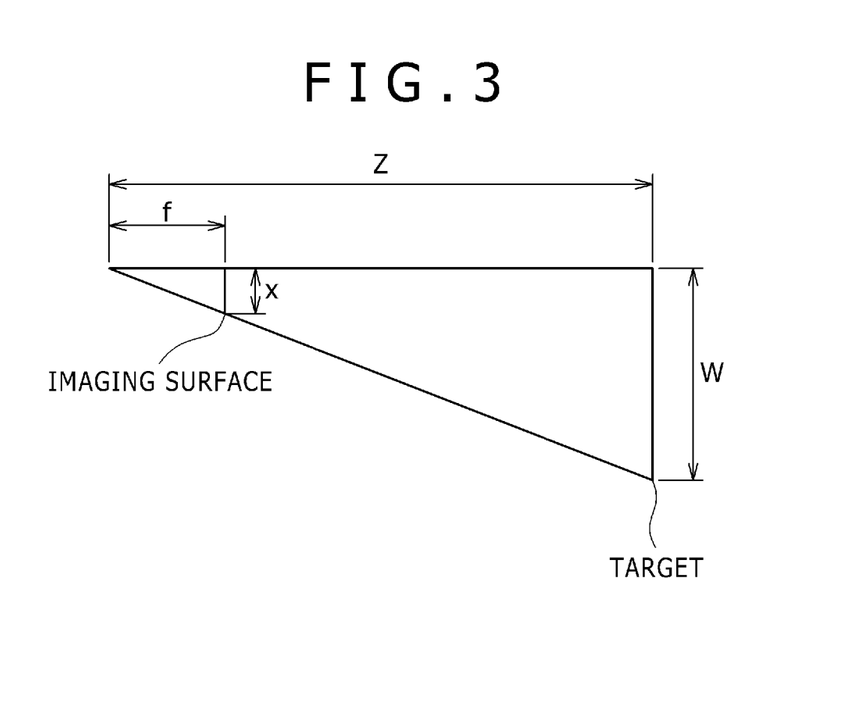
FIG. 3 is a diagram describing a method of calculating the distance to a target using a monocular camera.

FIG. 3 describes a method of calculating the distance to a target using the camera 101 or 102. In FIG. 3, W is the width of a preceding vehicle, Z is the distance to the preceding vehicle, x is the vehicle width on the imaging surface, and f is the focal distance of the camera. The relationship represented by formula (2) shown below holds between these parameters. This makes it possible to calculate the distance W to the preceding vehicle.

[Formula 2]

$$Z = W \cdot f / x \tag{2}$$

Here, the monocular distance calculation section 203 may not be able to accurately calculate the distance to the preceding vehicle if the image capturing direction of the camera and the rear face of the vehicle are not approximately perpendicular to each other, for example, when the vehicle is on a sloped or curved road surface. Further, because the distance to the preceding vehicle is calculated using, for example, an assumed vehicle width, an error may occur in the calculated distance to the vehicle if the width of the vehicle, a target, is unknown.

For this reason, the stereo distance calculation section 204 illustrated in FIG. 2 calculates the distance to a target (second distance) based on pieces of image information, one captured by the camera 101 and stored in the camera image storage section 104a and another captured by the camera 102 and stored in the camera image storage section 104b. More specifically, the disparity is calculated by searching for matching pixels from image information obtained from the camera image storage sections 104a and 104b, after which the distance to the target is calculated (refer to FIG. 9). The calculation result thereof is transmitted to the output distance calculation section 206.

Still more specifically, the SAD (Sum of the Absolute Difference) calculation method, for example, is used to search for matching points between two images captured by the cameras 101 and 102 in order to calculate the disparity. Using a specific portion of one of the images as a template, a matching position is searched for in the other image, followed by the calculation of the sum of the absolute differences of the brightness levels of the pixels. The sum is determined to be the matching position because it has the highest correlation. As a result, the positional deviation between the two images can be considered disparity. Here, the vertical positions of the two images are registered with each other in advance (this is referred to as "paralleling") for efficient processing by hardware. Using a specific portion of one of the images the size of which is about four pixels by four pixels, the other image is searched only horizontally. An image created by performing this task over the entire image is referred to as a "range image." Next, in order to detect the vehicle, a target, from the "range images" prepared as described above, a plane is searched for which is at the same distance from the group of "range images." If the width of the target on that plane is apparently that of a vehicle, a search is made assuming that the target is a "vehicle." Then, the mean value of the distances in a plurality of "vehicle" areas detected as described above is calculated so as to calculate the distance to the vehicle, a target.

Here, it is desirable that the calculation results obtained by the monocular distance calculation section 203 and the stereo distance calculation section 204 are the same. However, the two calculation results are not necessarily the same, for example, because of the difference in calculation method.

For this reason, the distance estimation section 202 performs a process called tracking, estimating the distance at the time of the current detection (at the time of capturing of images by the cameras 101 and 102) from the previously detected position and transmitting the estimation result to the output distance calculation section 206. More specifically, the distance estimation section 202 stores the behaviors of the own vehicle and the target such as vehicle area when the target was previously detected, thus estimating the distance to the target at the time of the current detection. Still more specifically, for example, the distance estimation section 202 stores the relative speed with respect to the preceding vehicle at the time of the previous detection, thus estimating the relative speed with respect to the target at the time of the current detection based on the elapsed time from the previous detection to the current detection. It should be noted that the calculation result of the monocular distance calculation section 203 or the stereo distance calculation section 204 can be used, for example, as the distance to the target at the time of the previous detection.

Then, the output distance calculation section 206 calculates the distance to be output (final distance) which will be output to control systems such as brakes, indicators and other systems based on the distances transmitted from the monocular distance calculation section 203 and the stereo distance calculation section 204, the blurriness level transmitted from the blurriness level calculation section 201, and the estimated distance transmitted from the distance estimation section 202. At this time, the output distance calculation section 206 uses a selection table to select, as the distance to be output, one of the distances transmitted from the monocular distance calculation section 203 and the stereo distance calculation section 204. The selection table includes the blurriness levels and the estimated distances stored in advance in the ROM 105 as parameters.

Figure 4:
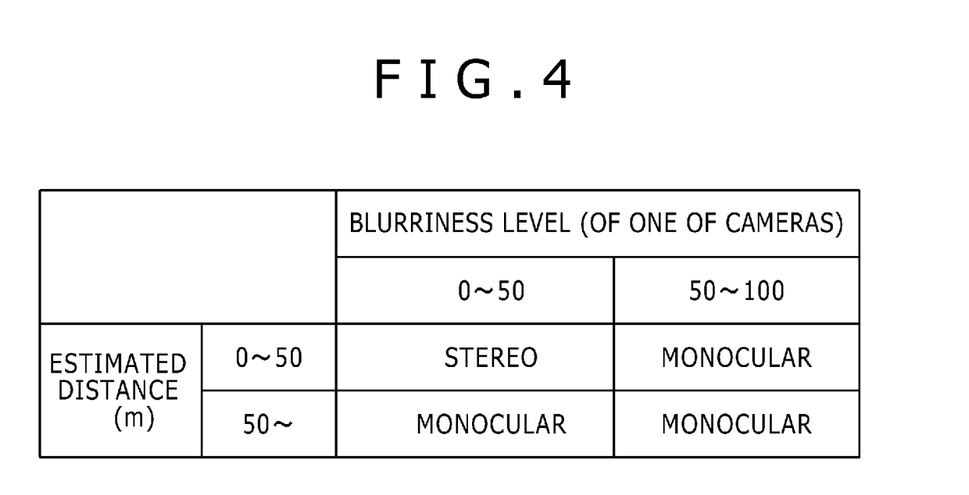
FIG. 4 is a diagram illustrating an example of a selection table used by an output distance calculation section illustrated in FIG. 2.

FIG. 4 illustrates an example of a selection table used by the output distance calculation section 206 illustrated in FIG. 2. It should be noted that the blurriness level of a camera image is normalized to a range from 0 to 100, with 0 indicating that there is no blurriness, and 100 indicating that the blurriness is maximal. Meanwhile, it is possible to select either the blurriness level of image information stored in the camera image storage section 104a or the blurriness level of image information stored in the camera image storage section 104b. The relatively greater of the two blurriness levels in particular is selected.

For example, if the estimated distance is closer than the threshold (e.g., closer than 50 m), and if the blurriness level of the image information is smaller than the threshold (e.g., smaller than 50) as illustrated in FIG. 4, it is probable that the stereo distance calculation section 204 can stably calculate the distance to the target. Therefore, the output distance calculation section 206 selects the distance (stereo distance) calculated by the stereo distance calculation section 204 as the distance to be output. Further, for example, if the estimated distance is closer than the threshold (e.g., closer than 50 m), and if the blurriness level of the image information is greater than the threshold (e.g., greater than 50), it is probable that the camera is in an anomalous condition because of dirt or raindrops adhering to the camera. Therefore, the output distance calculation section 206 selects the distance (monocular distance) calculated by the monocular distance calculation section 203 as the output distance. Still further, if the estimated distance is farther than the threshold (e.g., farther than 50 m), it is probable that distance calculation is difficult for the stereo distance calculation section 204 because of small disparity. Therefore, the output distance calculation section 206 selects the distance (monocular distance) calculated by the monocular distance calculation section 203 as the distance to be output.

It should be noted that if the distance (monocular distance) calculated by the monocular distance calculation section 203 is selected as the distance to be output, the monocular distance calculation section 203 compares the blurriness level of image information stored in the camera image storage section 104a and the blurriness level of image information stored in the camera image storage section 104b as described above so as to calculate the distance to the target based on the image information having relatively less blurriness level. Therefore, the distance measurement accuracy of the monocular distance calculation section 203 is maintained.

As described above, it is possible to calculate the relative distance to a target with stably high accuracy by selecting either the distance (monocular distance) calculated by the monocular distance calculation section 203 based on the estimated distance and the blurriness level or the distance (stereo distance) calculated by the stereo distance calculation section 204 even in the event of degradation of the imaging condition of one of the cameras due, for example, to dirt or raindrops.

Second Embodiment

Figure 5:
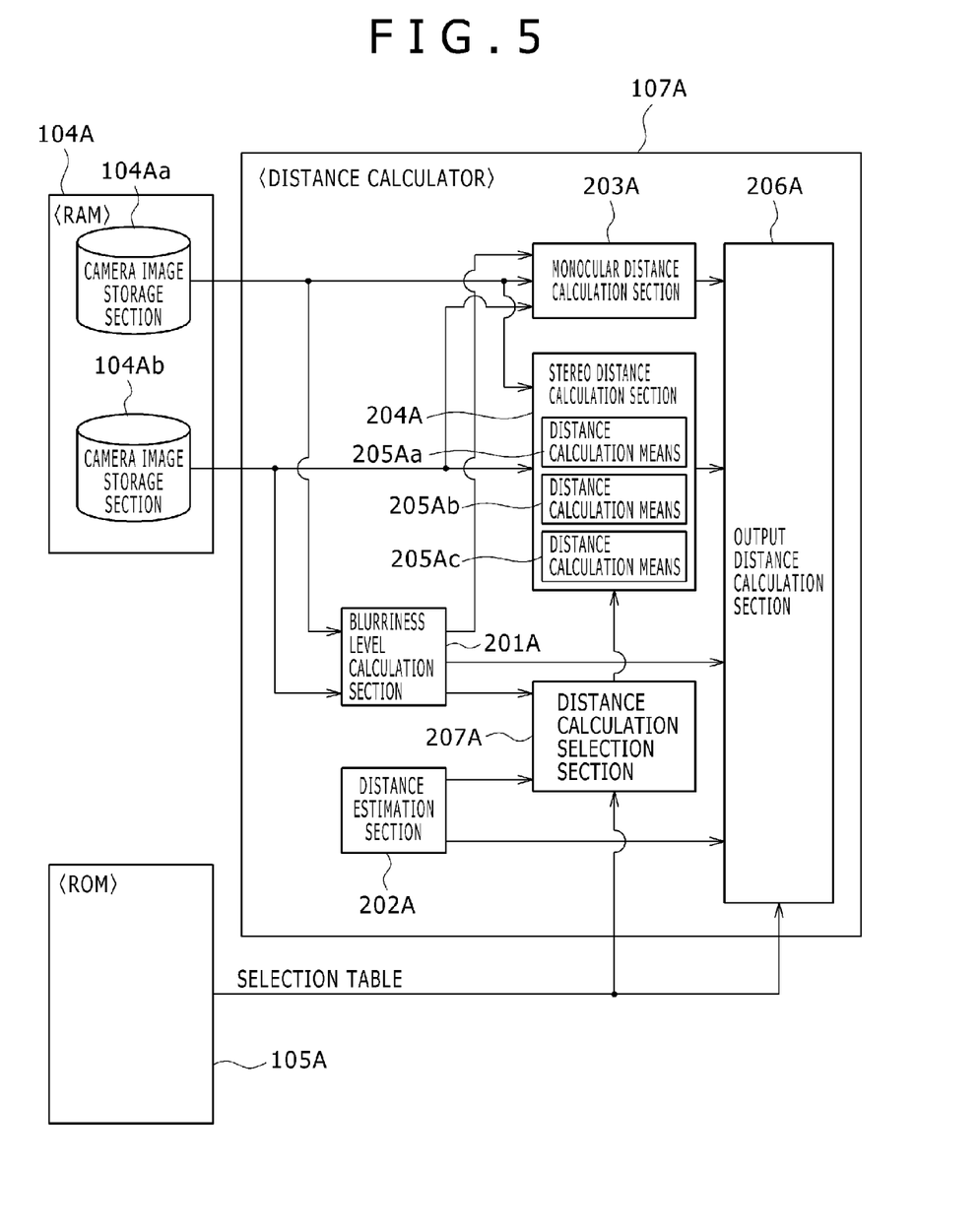
FIG. 5 is an internal configuration diagram illustrating the internal configuration of a second embodiment of the distance calculator according to the present invention.

FIG. 5 illustrates the internal configuration of a second embodiment of the distance calculator according to the present invention. A distance calculator 107A of the second embodiment illustrated in FIG. 5 differs from the distance calculator 107 of the first embodiment illustrated in FIG. 2 in that the stereo distance calculation section includes a plurality of distance calculation means. The distance calculator 107A is roughly identical to the distance calculator 107 in other components. Therefore, like components to those of the same calculator 107 will be denoted by like reference numerals, and a detailed description thereof will be omitted.

The distance calculator 204A illustrated in FIG. 5 includes three distance calculation means 205Aa, 205Ab, and 205Ac that use difference methods to calculate distance to a target.

The distance calculation means 205Aa uses the same distance calculation method as the stereo distance calculation section 204 of the first embodiment. The distance calculation means 205Aa uses a four-pixel-by-four-pixel area of the image information stored in a camera image storage section 104Aa as a block to search for matching points in the image information stored in a camera image storage section 104Ab. The distance calculation means 205Aa is advantageous in that it can be readily implemented by hardware because the same arithmetic operations are repeated.

On the other hand, the distance calculation means 205Ab searches, for example, the image information stored in the camera image storage section 104Aa for a target such as vehicle area through pattern matching with a template of a target such as vehicle prepared in advance. Then, the same means 205Ab searches the image information stored in the camera image storage section 104Ab using the target such as vehicle area, clipped from the image information stored in the camera image storage section 104Aa, as a template, thus calculating the disparity between the cameras and the distance to the target. The distance calculation means 205Ab is advantageous in that because the same means 205Ab uses a target such as vehicle area as a template to search the image information stored in the camera image storage section 104Aa for the target such as vehicle area, all the pixel values of the area subject to distance calculation can be used for making search, thus providing improved matching accuracy. Therefore, it is possible to calculate the distance to the target with high accuracy even if the target is located far away.

Further, the distance calculation means 205Ac calculates the position of the target from the image information stored in the camera image storage section 104Aa and the image information stored in the camera image storage section 104Ab through pattern matching with a template of a target such as vehicle prepared in advance. Then, the same means 205Ac calculates the disparity between the cameras from the position of the target in the image stored in the camera image storage section 104Aa and the position of the target in the image stored in the camera image storage section 104Ab, thus calculating the distance to the target. The distance calculation means 205Ac is advantageous in that it is robust, for example, against image blurriness through pattern matching with a template of a target such as vehicle. Therefore, it is possible to calculate the distance to the target relatively precisely even in the event of degradation of the imaging conditions of both of the cameras.

Here, the distance calculator 107A includes a distance calculation selection section 207A. The distance calculation selection section 207A transmits, to a stereo distance calculation section 204A, a signal relating to which of the three distance calculation means 205Aa, 205Ab, and 205Ac of the stereo distance calculation section 204A, is to be used based on the blurriness level transmitted from a blurriness level calculation section 201A, the estimated distance transmitted from a distance estimation section 202A, and a selection table (refer to FIG. 6) which will be described later.

Upon receipt of the signal, the stereo distance calculation section 204A calculates the distance to the target based on the distance calculation means appropriate to the information and the image information stored in the camera image storage sections 104Aa and 104Ab, transmitting the calculation result to an output distance calculation section 206A.

The output distance calculation section 206A calculates the distance to be output (final distance) which will be output to control systems such as brakes, indicators and other systems based on the distance transmitted from a monocular distance calculation section 203A, the distance transmitted from the stereo distance calculation section 204A and calculated using one of the distance calculation means 205Aa, 205Ab, and 205Ac, the blurriness level transmitted from the blurriness level calculation section 201A, and the estimated distance transmitted from the distance estimation section 202A. At this time, the output distance calculation section 206A selects, as the distance to be output, either the distance transmitted from the monocular distance calculation section 203A or the distance transmitted from the stereo distance calculation section 204A using a selection table. The selection table includes the blurriness levels and the estimated distances stored in advance in a ROM 105A as parameters.

Figure 6:
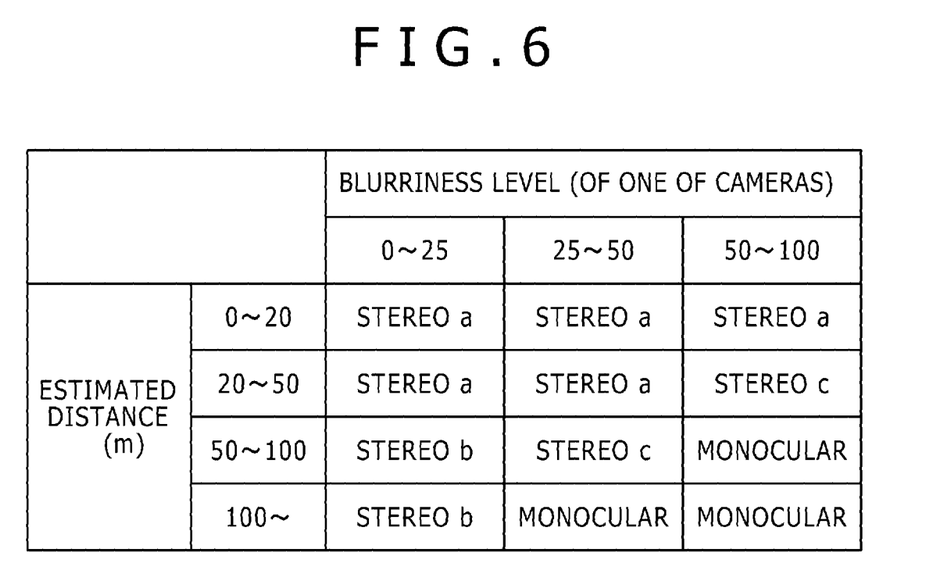
FIG. 6 is a diagram illustrating an example of a selection table used by the output distance calculation section illustrated in FIG. 5.

FIG. 6 illustrates an example of a selection table used by the distance calculation selection section 207A and the output distance calculation section 206A illustrated in FIG. 5. It should be noted that it is possible to select either the blurriness level of image information stored in the camera image storage section 104Aa or that of image information stored in the camera image storage section 104Ab. The relatively greater of the two blurriness levels in particular is selected.

For example, if the estimated distance is closer than the threshold (e.g., closer than 20 m or 50 m) as illustrated in FIG. 6, it is probable that the imaging condition is not so much affected by dirt, raindrops or other adverse condition. Therefore, the output distance calculation section 206A selects, as the distance to be output, the distance (stereo 'a' distance) calculated using the distance calculation means 205Aa that is particularly robust against an arbitrary target of all the distance calculation means of the stereo distance calculation section 204A. Further, if the estimated distance is farther than the threshold (e.g., farther than 50 m), and if the blurriness level of the image information is smaller than the threshold (e.g., smaller than 25), the output distance calculation section 206A selects, as the distance to be output, the distance (stereo 'b' distance) calculated using the distance calculation means 205Ab that can particularly measure the distance to a remote target with high accuracy of all the distance calculation means of the stereo distance calculation section 204A. Still further, if the estimated distance is in a medium-to-short distance range (e.g., 21 to 100 m or so), and if the blurriness level of the image information is relatively great (e.g., greater than 25), the output distance calculation section 206A selects, as the distance to be output, the distance (stereo 'c' distance) calculated using the distance calculation means 205Ac that is particularly robust against image blurriness of all the distance calculation means of the stereo distance calculation section 204A.

Still further, if the estimated distance is far (e.g., farther than 50 m), and if the blurriness level of the image information is relatively great (e.g., greater than 50), it is probable that distance calculation is difficult for the stereo distance calculation section 204A because of small disparity, and that the measurement accuracy will decline. Therefore, the output distance calculation section 206A selects the distance (monocular distance) calculated by the monocular distance calculation section 203A as the distance to be output. At this time, the monocular distance calculation section 203A compares the blurriness level of image information stored in the camera image storage section 104Aa and the blurriness level of image information stored in the camera image storage section 104Ab, calculating the distance to the target based on the image information having relatively less blurriness level. This ensures that the accuracy of distance measurement by the monocular distance calculation section 203A is maintained.

A specific description will be given below of the processing flow of the distance calculator 107A of the second embodiment illustrated in FIG. 5 with reference to FIGS. 7 and 8.

Figure 7:
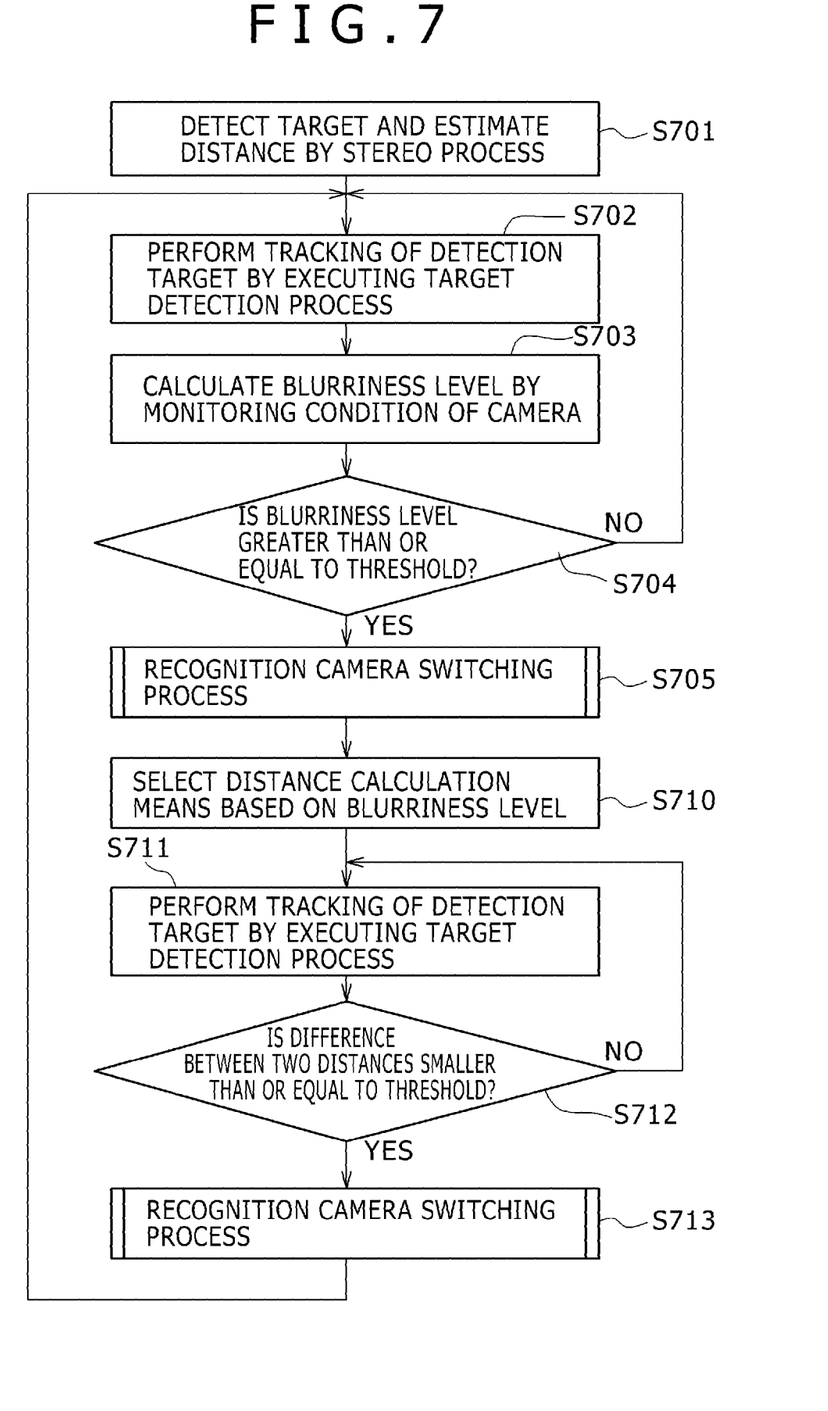
FIG. 7 is a flowchart illustrating the processing flow of the distance calculator illustrated in FIG. 5.
Figure 8:
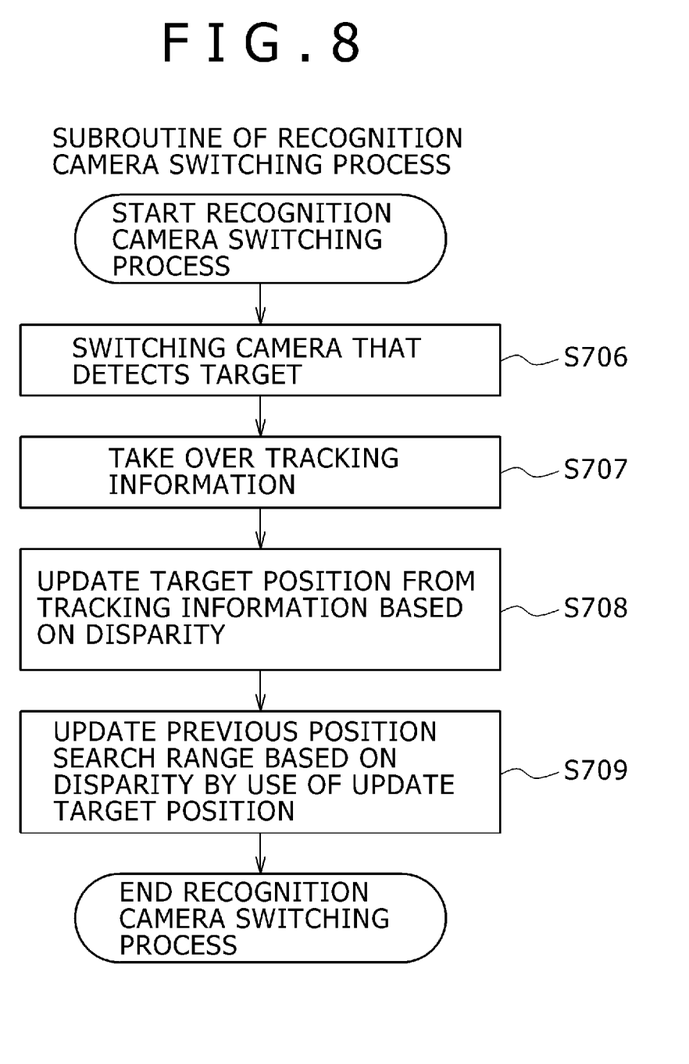
FIG. 8 is a flowchart illustrating the processing flow of a recognition camera switching process illustrated in FIG. 7.

FIG. 7 illustrates the processing flow of the distance calculator 107A of the second embodiment illustrated in FIG. 5. FIG. 8 illustrates the processing flow of a recognition camera switching process illustrated in FIG. 7.

First, the stereo distance calculation section 204A searches the image information stored in the camera image storage section 104Aa for a target such as vehicle area using a template of the target prepared in advance, calculating the distance (stereo distance) to that area as illustrated in FIG. 7 (S701).

Next, the distance estimation section 202A performs tracking, calculating the estimated distance at the time of the current detection (S702).

Next, the blurriness level calculation section 201A calculates the blurriness level of the image information stored in the camera image storage section 104Aa and the blurriness level of the image information stored in the camera image storage section 104Ab (S703). Here, it is determined whether the calculated blurriness level is equal to or greater than the threshold (S704). If the blurriness level is smaller than the threshold, control returns to the tracking of the distance estimation section 202A (S702). On the other hand, if the blurriness level is equal to or greater than the threshold, the recognition camera switching process of the stereo distance calculation section 204A is performed (S705).

The recognition camera switching process is designed to switch the image information used for template matching of the stereo distance calculation section 204A from the image information stored in the camera image storage section 104Aa over to that stored in the camera image storage section 104Ab or vice versa. Here, the recognition camera switching process can recognize both the image information stored in the camera image storage section 104Aa and the image information stored in the camera image storage section 104Ab. However, doing so results in twice as much processing. In order to handle the process with limited built-in hardware resources, the camera image information is switched according to the blurriness level calculated by the blurriness level calculation section 201A.

That is, the recognition camera switching process switches from one camera to another to detect the target such as vehicle (S706) and takes over tracking information of the previous frame (S707). This is designed to predict the approximate position to which the target will move at the time of the current detection (capturing of an image by the camera) using the detected position information at the time of the previous detection, thus interpolating the target position if the target detection fails or correcting a small deviation of the detected target position for stable target detection results. However, failing to take over this tracking information each time the camera images are switched results in temporary interruption of the tracking, leading to unstable target detection performance each time the camera images are switched. For this reason, because the tracking information that has been taken over includes at least the coordinates, distance, and relative speed in the image, the target position in the camera image at the time of the current detection is updated based on disparity from the tracking information that has been taken over (S708). Then, the target detection process is performed using the updated target position in the camera image, thus updating the previous position search range based on the disparity (S709). This permits smooth continuation of tracking even if the cameras are switched.

After the camera images are switched as described above, the stereo distance calculation section 204A selects the appropriate one from among the distance calculation means 205Aa, 205Ab, and 205Ac based on the blurriness level calculated by the blurriness level calculation section 201A (S710) as illustrated in FIG. 7. Next, the distance estimation section 202A calculates the estimated distance at the time of the current detection by performing tracking (S711), thus continuing the process using the post-switching camera image until the pre-switching camera image stabilizes.

Next, it is determined whether the difference between the distance (monocular distance) calculated by the monocular distance calculation section 203A and the distance (stereo distance) calculated by the stereo distance calculation section 204A is greater than a given threshold (S712). If the difference in distance is equal to or smaller than the threshold, the recognition camera switching process is performed (S713). Then, the distance estimation section 202A performs tracking again, calculating the estimated distance to the target at the time of the current detection (S702). On the other hand, if the difference in distance is greater than the threshold, the target detection process is performed using the same camera image rather than the recognition camera switching process (S711).

As described above, the stereo distance calculation section of the distance calculator 107A of the second embodiment includes three distance calculation means to cope with varying conditions. For example, it is possible to output an optical distance in accordance with the imaging condition of the camera and the distance to the target even in the event of degradation of the imaging condition of one of the cameras due, for example, to staining by dirt or raindrops. This allows for highly accurate calculation of the relative distance to the target with minimal impact of dirt or raindrops.

It should be noted that the estimated distances and the blurriness level thresholds illustrated in FIGS. 4 and 6 can be specified as appropriate in accordance with the imaging system 100 to which the distance calculator 107 or 107A is applied and the vehicle condition. Further, the blurriness level thresholds may be changed in accordance with the estimated distance to the target. For example, if the own vehicle detects a target and makes a sudden stop to avoid collision (called "pre-crash safety"), switching of the distance measurement method from stereo to monocular with the target being close may result in inaccuracy in measuring the distance to an arbitrary target. For this reason, when the distance to the target is close, the distance measured in stereo is selected, and the distance measurement method is switched from stereo to monocular in accordance with the blurriness level in the medium to long distance range. This makes it possible to use the same distance calculation method at all times when the distance to a target is close, simplifying the configuration of the distance calculator and reliably detecting the arbitrary target.

Although a case has been described in the first and second embodiments described above in which two cameras (imaging devices) are used, the number of imaging devices may be changed as appropriate so long as at least two imaging devices are available to permit distance measurement to a target with a stereo camera.

Further, although a case has been described in the first and second embodiments described above in which monocular cameras are used as one or both of the cameras (imaging devices) making up a stereo camera, cameras making up a stereo camera and a monocular camera may be provided separately.

Still further, although a case has been described in the first and second embodiments described above in which the distance calculator incorporates a blurriness level calculation section and a distance estimation section, the blurriness level calculation section and the distance estimation section may be, for example, provided outside the distance calculator.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

Note also that some or all of the aforementioned components, functions, processors, and the like can be implemented by hardware such as an integrated circuit or the like. Alternatively, those components, functions, and the like can be implemented by software as well. In the latter case, a processor can interpret and execute the programs designed to serve those functions. The programs, associated data tables, files, and the like can be stored on a stationary storage device such as a memory, a hard disk, and a solid state drive (SSD) or on a portable storage medium such as an integrated circuit card (ICC), an SD card, and a DVD.

Further note that the control lines and information lines shown above represent only those lines necessary to illustrate the present invention, not necessarily representing all the lines required in terms of products. Thus, it can be assumed that almost all the components are in fact interconnected.

DESCRIPTION OF THE REFERENCE NUMERALS

100: Imaging system
101, 102: Cameras (imaging devices)
103: Camera controller 101
104: RAM
104a, 104b: Camera image storage sections
105: ROM
106: External IF 106
107: Distance calculator
108: CPU
109: Bus
201: Blurriness level calculation section
202: Distance estimation section
203: Monocular distance calculation section (first distance calculation section)
204: Stereo distance calculation section (Second distance calculation section)
206: Output distance calculation section

The invention claimed is:

1. A distance calculator for an imaging system having a plurality of imaging devices, the distance calculator comprising:
a first distance calculator circuit, the first distance calculator circuit calculates distance to a target based on image information captured by one of the plurality of imaging devices;
a second distance calculator circuit, the second distance calculator circuit calculates distance to the target based on image information captured by at least two of the plurality of imaging devices;
a blurriness level calculator circuit, the blurriness level calculator circuit calculates a blurriness level of the image information captured by the single imaging device and a blurriness level of the image information captured by the at least two imaging devices;
a distance estimator circuit, the distance estimator circuit estimates distance to the target at the time of capturing of images by the single imaging device and the at least two imaging devices; and
an output distance calculator circuit, the output distance calculator circuit calculates distance to the target to be output, wherein
the output distance calculator circuit selects a first distance calculated by the first distance calculator circuit as the distance to be output when the distance estimated by the distance estimator circuit is lower than a predetermined distance threshold and when the blurriness level calculated by the blurriness level calculator circuit is lower than a predetermined blurriness threshold;
the output distance calculator circuit selects a second distance calculated by the second distance calculator circuit as the distance to be output when the distance estimated by the distance estimator circuit is lower than the predetermined distance threshold and when the blurriness level calculated by the blurriness level calculator circuit is higher than the predetermined blurriness threshold; and
the output distance calculator circuit selects the second distance calculated by the second distance calculator circuit as the distance to be output when the distance estimated by the distance estimator circuit is higher than the predetermined distance threshold.

2. The distance calculator of claim 1, wherein
the first distance calculator circuit calculates distance to the target based on the image information having the smallest blurriness level of the image information captured by the single imaging device and the image information captured by the at least two imaging devices.

3. The distance calculator of claim 1, wherein
the second distance calculator circuit has a plurality of distance calculation means adapted to calculate the distance to the target based on the image information captured by the at least two imaging devices.

4. The distance calculator of claim 3 further comprising:
a distance selector, the distance selector selects one of the plurality of distance calculation means based on the blurriness levels calculated by the blurriness level calculator circuit and the distance estimated by the distance estimator circuit.

5. A distance calculation method of an imaging system having a plurality of imaging devices, the distance calculation method comprising:
calculating a first distance to a target based on image information captured by one of the plurality of imaging devices;
calculating a second distance to the target based on image information captured by at least two of the plurality of imaging devices;
calculating blurriness level of the image information captured by the single imaging device and that of the image information captured by the at least two imaging devices;
estimating distance to the target at the time of capturing of images by the single imaging device and the at least two imaging devices; and
selecting, as distance to the target to be output:
the first distance when the estimated distance is lower than a predetermined distance threshold and when the blurriness level is lower than a predetermined blurriness threshold;
the second distance when the estimated distance is lower than the predetermined distance threshold and when the blurriness level is higher than the predetermined blurriness threshold; or
the second distance when the estimated distance is higher than the predetermined distance threshold.

* * * * *